(12) United States Patent  (10) Patent No.: US 7,513,467 B1
Hurley  (45) Date of Patent: Apr. 7, 2009

(54) MOUNTABLE TELESCOPING RODS DEVICE

(76) Inventor: Victoria L. Hurley, 301 Diamond Springs Station, Lewisburg, KY (US) 42256

( * ) Notice: Subject to any disclaimer, the term of this patent is extended or adjusted under 35 U.S.C. 154(b) by 0 days.

(21) Appl. No.: 11/830,558

(22) Filed: Jul. 30, 2007

(51) Int. Cl.
F16M 13/00 (2006.01)
(52) U.S. Cl. .................... 248/125.9; 248/291.1
(58) Field of Classification Search ............. 248/125.8, 248/125.9, 125.7, 291.1, 292.13, 296.1, 284.1; 296/78.1, 77.1, 83, 92, 96.2, 96.21
See application file for complete search history.

(56) References Cited

U.S. PATENT DOCUMENTS

| 576,860 | A | 9/1896 | Monaghan |
| 959,188 | A | 5/1910 | Woodward |
| RE13,574 | E | 6/1913 | Samuel |
| 1,087,104 | A | 2/1914 | Brine |
| 1,167,609 | A | 1/1916 | Ackerman |
| 1,393,239 | A | 10/1921 | Morriss |
| 1,483,652 | A | 2/1924 | Donigan |
| 1,509,450 | A | 9/1924 | Sweeney |
| 1,595,274 | A | 8/1926 | White |
| 1,666,580 | A | 4/1928 | Park |
| 1,773,040 | A | 8/1930 | Harden |
| 1,798,524 | A | 3/1931 | Di Palma |
| 1,834,167 | A | 12/1931 | McVeety |
| 2,129,933 | A * | 9/1938 | Hueglin .................. 416/244 R |
| 2,319,869 | A | 5/1943 | Kramer |
| 2,836,140 | A | 5/1958 | Hunt, Jr. |
| 3,301,589 | A | 1/1967 | Hayden |
| 4,237,995 | A | 12/1980 | Pivar |
| 4,325,448 | A | 4/1982 | Pivar |
| 4,353,590 | A | 10/1982 | Wei-Chuan |
| 4,773,695 | A | 9/1988 | Jones et al. |
| 4,950,017 | A | 8/1990 | Norton |
| 4,973,082 | A | 11/1990 | Kincheloe |
| 5,174,622 | A | 12/1992 | Gutta |
| 5,195,797 | A | 3/1993 | Hobbs |
| 5,255,627 | A | 10/1993 | Williams |
| RE35,757 | E | 3/1998 | Heavner |
| 6,012,756 | A | 1/2000 | Clark-Dickson |
| 6,056,249 | A * | 5/2000 | Fillon, Jr. ................. 248/125.7 |
| 6,263,894 | B1 | 7/2001 | LaMantia |
| 6,543,830 | B1 | 4/2003 | Stuck |
| 6,685,146 | B1 * | 2/2004 | Sanchez, Jr. ............. 248/125.7 |
| 6,786,526 | B1 | 9/2004 | Blalock |
| 7,007,999 | B1 | 3/2006 | Schneller |
| 7,147,263 | B2 | 12/2006 | Schneidau et al. |
| 2002/0084669 | A1 | 7/2002 | Goodstein |
| 2004/0075293 | A1 | 4/2004 | Khavari |
| 2006/0086470 | A1 * | 4/2006 | Ghazali ................. 160/370.21 |

* cited by examiner

Primary Examiner—Ramon O Ramirez
(74) Attorney, Agent, or Firm—Laura M. Hagan

(57) ABSTRACT

A mountable telescoping rods device, including a mounting bracket capable of being mounted on a flat surface or onto a bar structure and a telescoping rod assembly mounted into the mounting bracket capable of rotating in an arc. A mounting bracket of the mountable telescoping rods device includes a mounting stand which also may be independently rotated to provide additional adjustment features for the telescoping rods. Typically use of the mountable telescoping rods device would be in conjunction with an all-terrain vehicle or other vehicle which is driven into rough terrain or remote areas so as to prevent the user from coming into contact with undesirable objects, such as spider webs.

1 Claim, 7 Drawing Sheets

MOUNTABLE TELESCOPING RODS DEVICE

This application was funded by an award from the Kentucky Science and Technology Corporation under Contract #146-403-155.

SUMMARY

All-terrain vehicles (ATVs) are utilized by various individuals and have become very popular within the last several years due to their ability to maneuver into rough terrain and remote areas. Most ATVs do not have a windshield and so, many times, when riding the ATV and maneuvering in remote areas that are populated by trees and dense vegetation, a driver's face or body will encounter undesirable objects, such as spider webs.

The present invention attempts to address this problem for drivers riding ATVs without windshields by fixing a pair of mountable telescoping rods devices on the front area of the ATV. The present invention is capable of clearing spider webs so that they do not encounter the driver's face. The height of the telescoping rods of the present invention may be adjusted, depending upon the height of the driver. Additionally, the present invention may be retracted and rotated so that it can be placed in a folded down or low profile position and further secured to the ATV. Thus, the presence of the present invention would not interfere with a user's enjoyment of the ATV, when the ATV is not in an area where spider webs or other similar obstacles would be a concern.

BRIEF DESCRIPTION OF THE DRAWINGS

Reference to the figures discloses a mountable telescoping rods device and is not to be interpreted as limiting the scope of the present invention, as similar products and methods of use will become known by persons having ordinary skill in the art upon a reading of the present disclosure.

DETAILED DESCRIPTION OF THE INVENTION

The following description describes embodiments of a mountable telescoping rods device 10. In the following description, numerous specific details and options are set forth in order to provide a more thorough understanding of the present invention 10. It will be appreciated, however, by one skilled in the art that the present invention 10 may be practiced without such specific details or optional components and that such descriptions are merely for convenience and that such are selected solely for the purpose of illustrating the present invention 10. As such, reference to the figures showing embodiments of the present invention 10 is made to describe the present invention 10 and not to limit the scope of the disclosure and claims herein.

Figure 1:
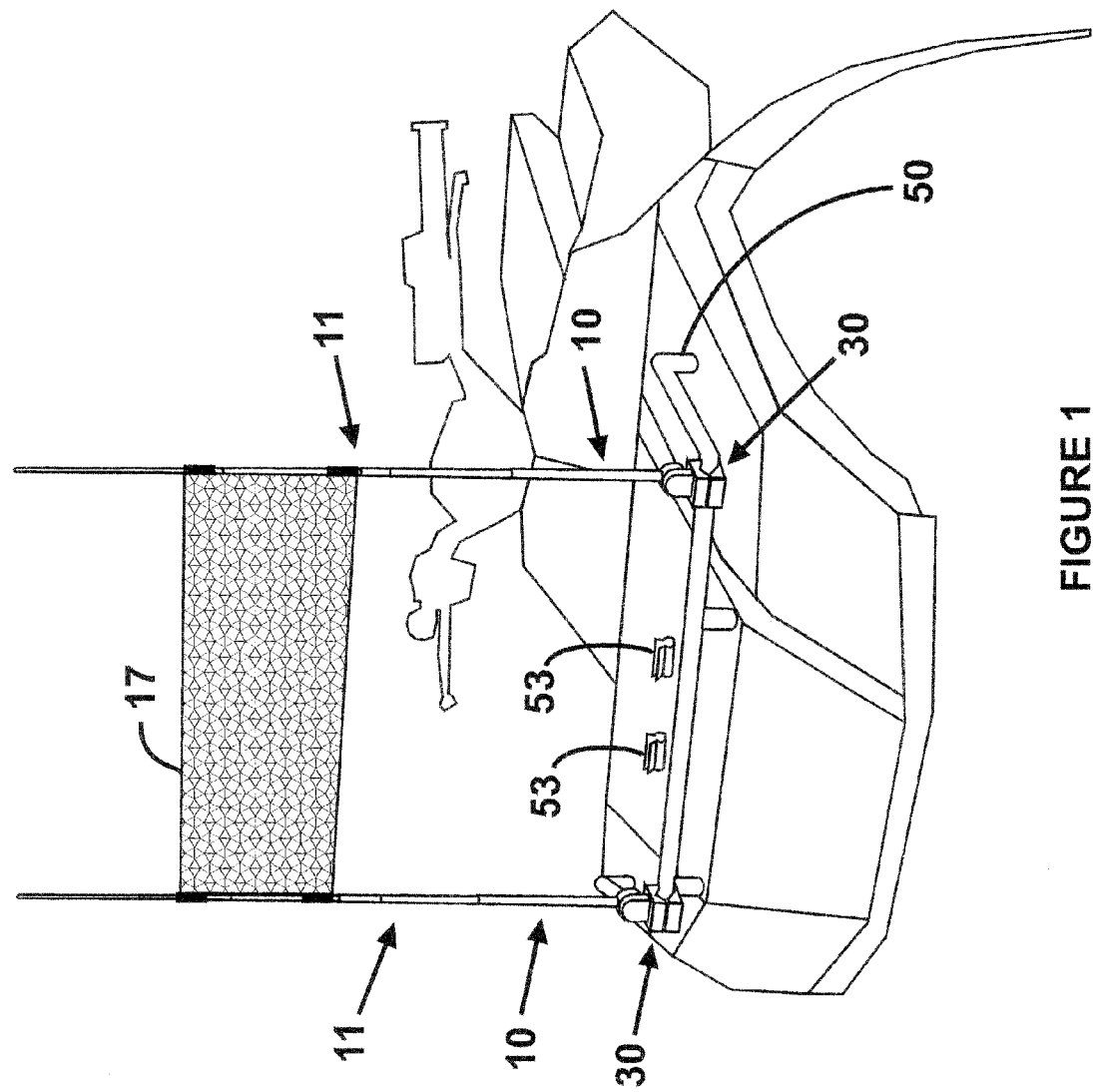
FIG. 1 illustrates a perspective view of the present invention mounted on a bar structure.

The present invention 10 is generally utilized in conjunction with ATVs when used in rough terrain areas with dense vegetation. However, the present invention 10 could be utilized on other moving vehicles, such as bicycles, motorcycles, dune buggies, etc. The present invention 10, as shown in FIG. 1, includes a telescoping rod assembly 11, which is mounted via a mounting bracket 30 onto the front area of an ATV, near the steering mechanism.

Figure 7:
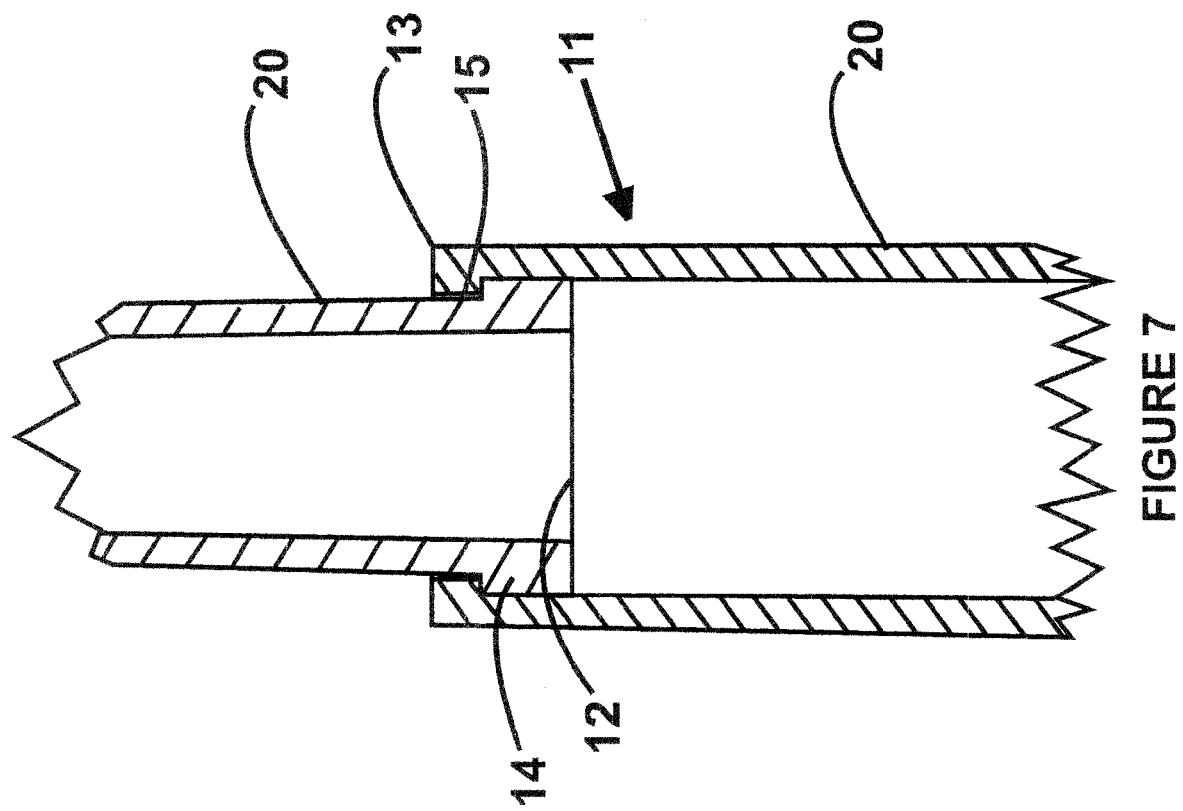
FIG. 7 illustrates a cross-section of telescoping rods.

Telescoping rod assemblies 11 are incorporated into many mechanical devices, and numerous types of telescoping assemblies may be compatible on the present invention 10. A simple and typical telescopic rod assembly 11 which may be used is shown in FIG. 7 and is a friction type unit where two or more tubes 20 are fitted together inline with each other. The telescoping rod assembly 11 is designed so that with a moderate pulling force applied to the end of the last tube 20 in succession, the tubes 20 will extend to the desired length. Each tube 20 has a first and second end 12, 13 and tapers from a larger diameter at the first end 12 to a smaller diameter at the second end 13. The first tube 20 is the largest in diameter and each tube in succession is slightly smaller in diameter than the preceding tube. Each tube 20 has a first end 12 with an opening that extends through the length of the tube through to the second end 13, parallel with the axis of the tube 20. The second end 13 of each tube 20, except for the last one in succession which may not, has an inward facing shoulder 15 on the inside diameter which is positioned to come into contact with an outward facing shoulder 14 located on the first end 12 of the next tube 20 in succession. The first end 12 of the first tube 20 in succession may not have an outward facing shoulder, as in the present invention it is mounted into a mounting bracket 30. When the inline tubes 20 are placed in an extended position, the inward facing shoulder 15 and the outward facing shoulder 14 abut against each other and prevent the tubes 20 in the inline succession from pulling apart when extended. The outward facing shoulder 14 on the first end 12 of each of the tubes 20 is slightly larger than the inside diameter of the second end 13 of the preceding tube 20 in succession and thus causes friction and/or drag so that the extended tubes 20 do not easily slide back into a collapsed condition. In addition, a ring may be added to the outside diameter of the first end 12 of each tube 20 to apply friction or drag to the inner diameter of the preceding tube 20. Other means of providing a telescoping function for inline tubes may be utilized by the present invention 10.

Figure 2:
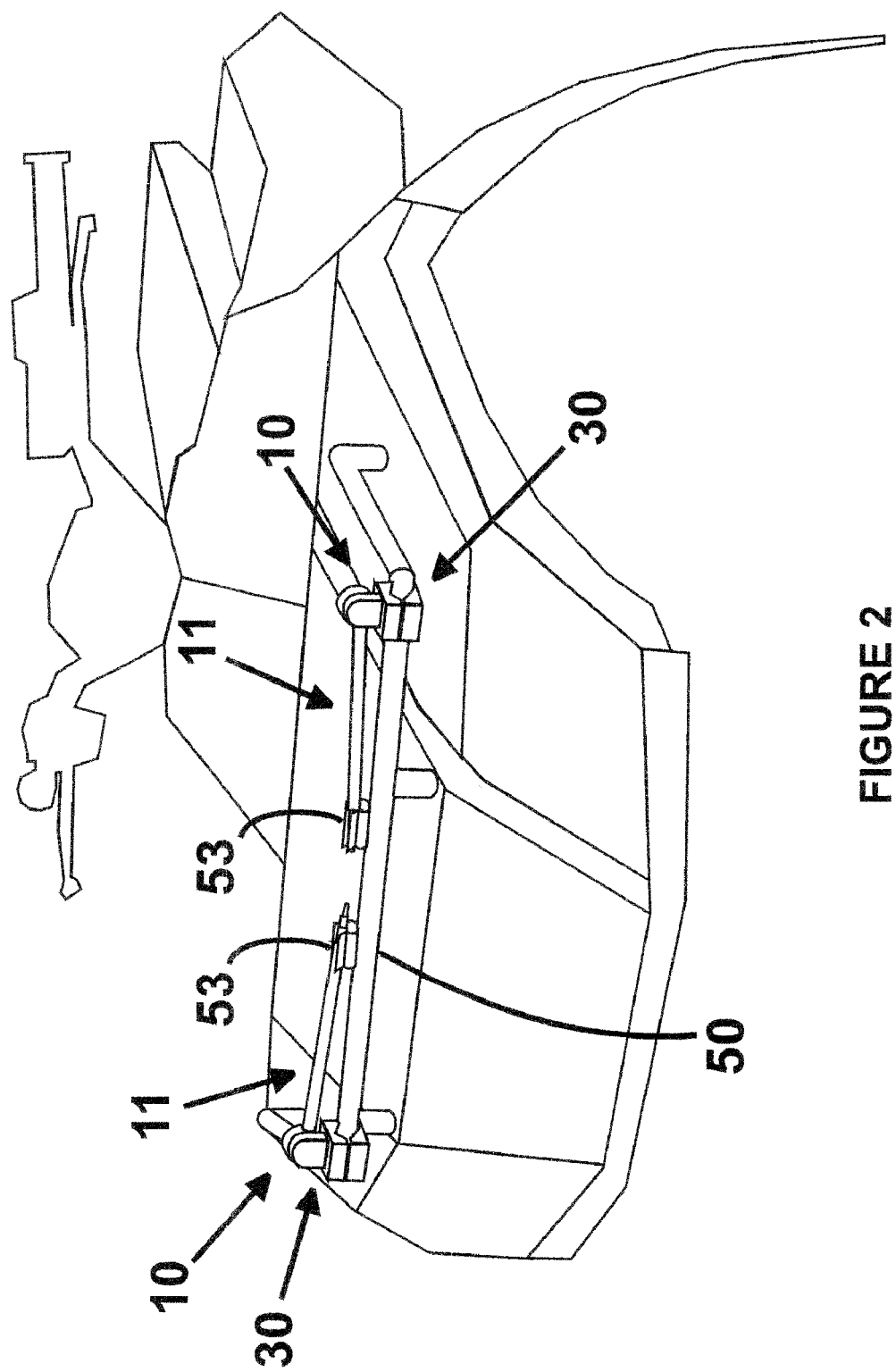
FIG. 2 illustrates a perspective view of the present invention mounted on a bar structure in a low profile position.

When the telescoping rod assembly 11 is not in use, it can be collapsed into a retracted position and secured by a clip mechanism 53, also mounted on the ATV, as is shown in FIG. 2.

In an advantageous embodiment, the telescoping rod assembly 11 is manufactured of a material which allows for flexibility of the extended inline tubes 20. An example of such flexible material is fiberglass or other materials with similar properties. This flexibility prevents the telescoping rod assembly 11 from breaking when it comes into contact with sturdy tree branches or other vegetation.

The telescoping rod assemblies 11 are connected to the ATV by means of a mounting bracket 30. The telescoping rod assembly 11 is secured into an opening 31 in a mounting bracket 30 by a set screw, glue, interference fit or other similar method. The mounting bracket 30 may be secured to the surface of the body of the ATV or to a bar structure 50 located on the ATV. The bar structure 50 may be circular or square or some other shape. Depending upon the location where the present invention 10 is mounted, the structure of the mounting bracket 30 may vary.

On many ATVs, a bar structure 50 is located on the ATV as a grill around the headlights, as a rack mounted on the front of the vehicle or in some other location. The present invention 10 is capable of mounting onto any of these bar structures 50, whether the bar structure 50 is mounted to the ATV in a horizontal, vertical or angular fashion. Many types of mounting assembly brackets 30 may be utilized to attach the present invention 10 to an ATV. By way of illustration and not limitations three embodiments of a mounting bracket 30 are described and shown in the illustrations. It is understood that other mounting brackets 30 capable of achieving the same function could be utilized by the present invention 10. The mounting bracket 30 is designed so that it may be mounted on a bar structure 50 or to any flat surface of the body of an ATV.

Figure 4:
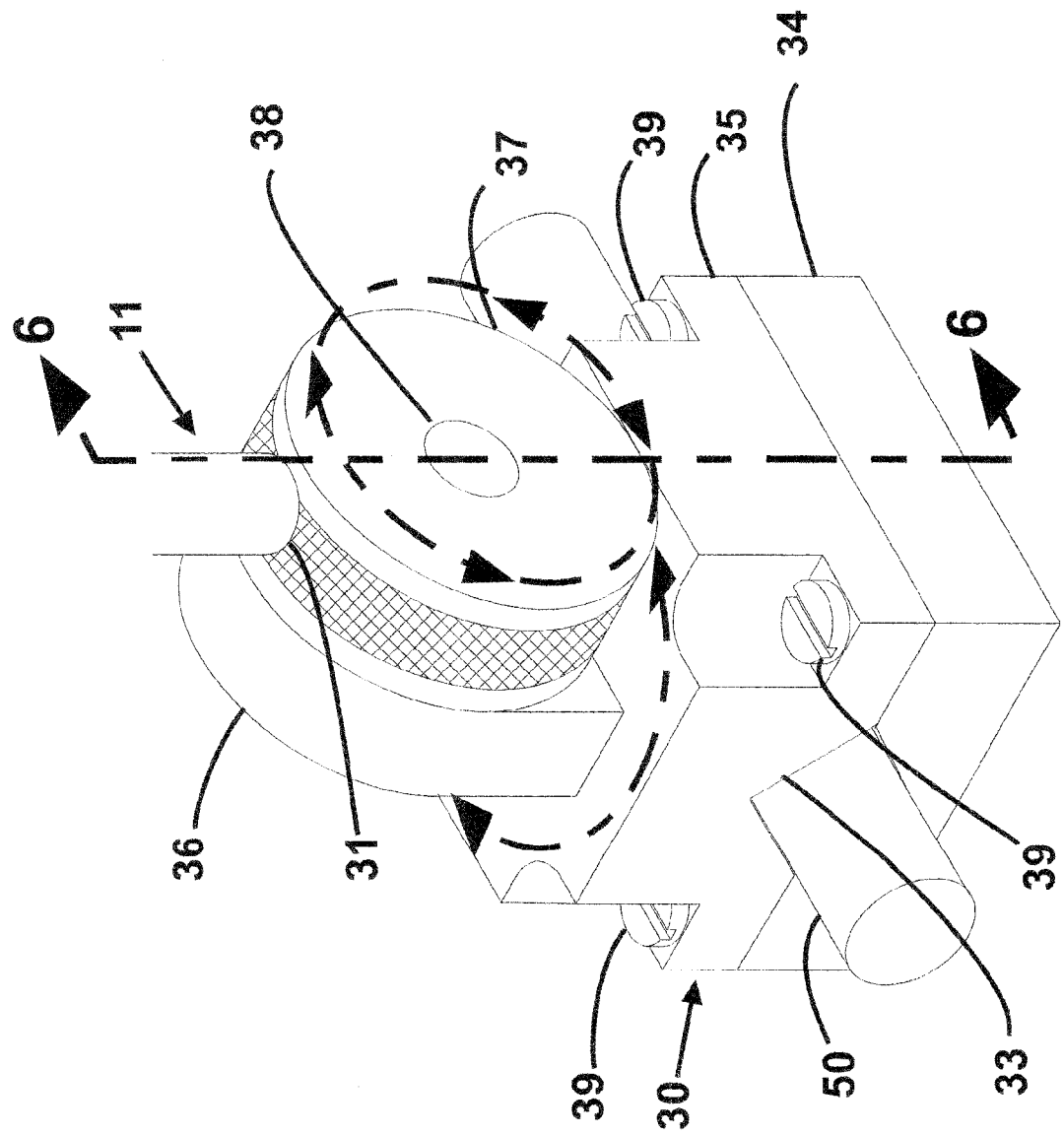
FIG. 4 illustrates a perspective view of the embodiment of the present invention.
Figure 5:
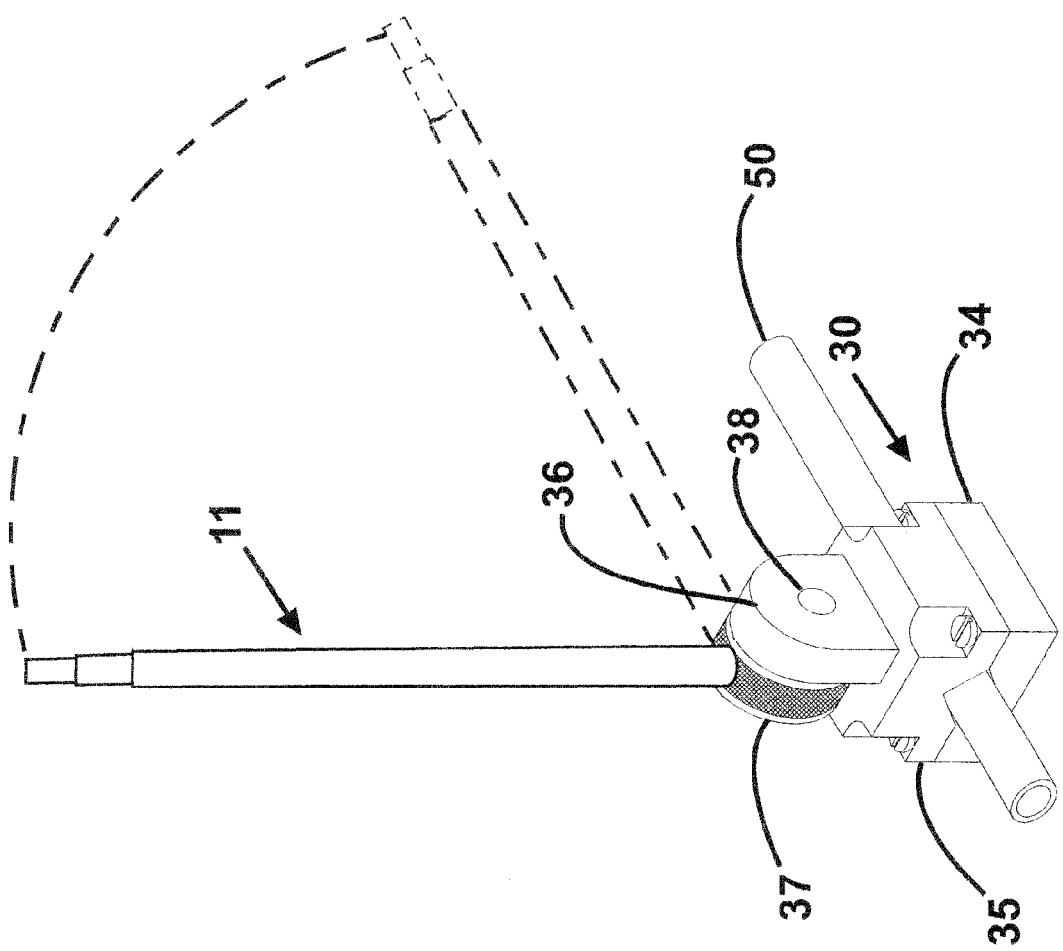
FIG. 5 illustrates a perspective view of an embodiment of the present invention.
Figure 6:
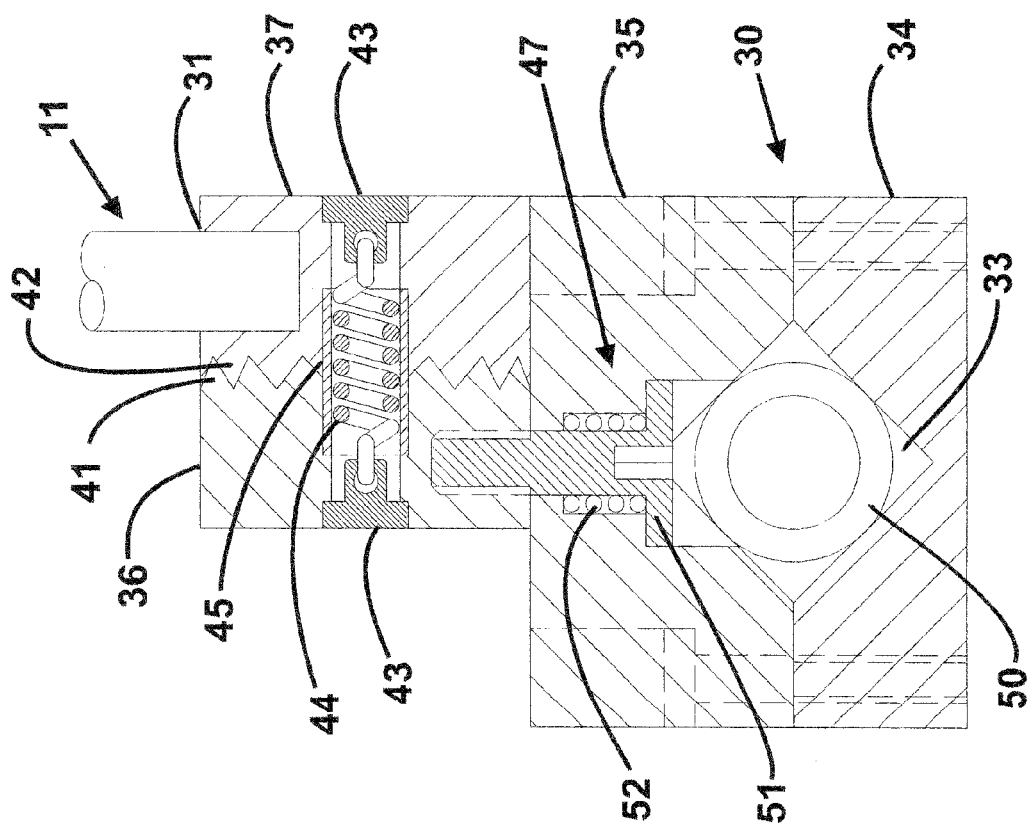
FIG. 6 illustrates a sectional view of an embodiment of the present invention shown in FIG. 4.

The embodiments of the mounting bracket 30 which is designed to accommodate a bar structure 50 is shown in FIGS. 4, 5 and 6 and may be comprised of a first and second base section 34, 35, with each base section 34, 35 having a groove or channel 33 within its body to cradle a portion of the bar structure 50. The channel 33 may be V-shaped or some other similar shape. Both the first and second base sections 34, 35 partially surround the bar structure 50 and connect together via two or more fasteners 39, for example screws, bolts or other similar devices. The fasteners 39, when tightened, create friction on the bar structure 50, therefore restricting the movement of the mounting bracket 30

Attached to the second base section 34 is a pivot block mounting stand 36. This mounting stand 36 may be a stationary structure as is shown in FIG. 5 and may be formed as a solid piece to the base 32. In this embodiment, a pivot block 37 is secured to the mounting stand 36 by means of a shaft, bolt, pin, axle or other type of securing mechanism 38. The telescoping rod assembly 11 is mounted into the pivot block 37 portion of the mounting bracket 30. The pivot block 37 and thus the telescoping rod assembly 11 is capable of rotating within an arc if the securing mechanism 38 is rotated so as to loosen the connection point between the mounting stand 36 and the pivot block 37.

FIGS. 4 and 6 disclose an advantageous embodiment of the present invention 10 wherein the pivot block 37 and the mounting stand 36 are each capable of rotation. In this embodiment, the securing mechanism 38 for the mounting stand 36 and the pivot block 37 is comprised of two anchor pins 43, a pull spring 44, and a guide pin 45. The two anchor pins 43 apply pressure to the mounting stand 36 and the pivot block 37 by connection to the pull spring 44. Once assembled, the mounting stand 36 and the pivot block 37 are pulled together by the pull spring 44 connected to each of the anchor pins 43. The guide pin 45 rotates freely in both the mounting stand 36 and the pivot block 37 and is used to maintain centrality of the two parts. This securing mechanism 38 allows for the pivot block 37 to be slightly withdrawn from and retracted to the mounting stand 36.

As shown in FIG. 6, a notched surface 41 is present on one of the surfaces of the mounting stand 36 and a notched surface 42 is also present on the pivot block 37. The pivot block 37 and the mounting stand 36 are further aligned by the mating of the corresponding notched surfaces 42, 41. With this embodiment, the telescoping rod assembly 11 which is secured to the pivot block 37 can be manually rotated by the user and maintained in a selected position by merely grasping and applying slight pressure to the telescoping rod assembly 11. Once a selected position is obtained, the notched surfaces of the pivot block and the mounting stand 42, 41 maintain the position of the telescoping rod assembly 11.

Another advantageous embodiment of the present invention 10, as is shown in FIGS. 4 and 6, includes the ability of the mounting stand to be rotated. In this embodiment, the mounting stand is not a formed part of the base 32 but rather is a separate unit which is secured to the base 32 through a separate attachment mechanism 47. By way of illustration and not limitation, an attachment mechanism 47 to secure the mounting stand 36 to the base 32 can be achieved by a threaded rotary pin 51 placed through an opening on the base 32 that extends into the mounting stand 36. A compression spring 52 may also be mounted on the rotary pin 51, applying friction pressure between the mounting block 36 and the base 32, creating a tension strong enough to resist easy rotation of the mounting stand 36. Additionally, the two mating surfaces of the mounting stand 36 and the base 32 may have mating notches present on them, similar to those shown on the mounting stand 36 and the pivot block 37, capable of providing better control for maintaining the exact location of the rotating mounting stand 36.

When this embodiment of the present invention 10 is utilized, a user will have great flexibility on deciding where the present invention 10 may be mounted. The rotation capability of the mounting stand 36 coupled with the rotation capability of the pivot block 37 allow for the present invention to be mounted on virtually any bar structure 50 located on an ATV.

Figure 3:
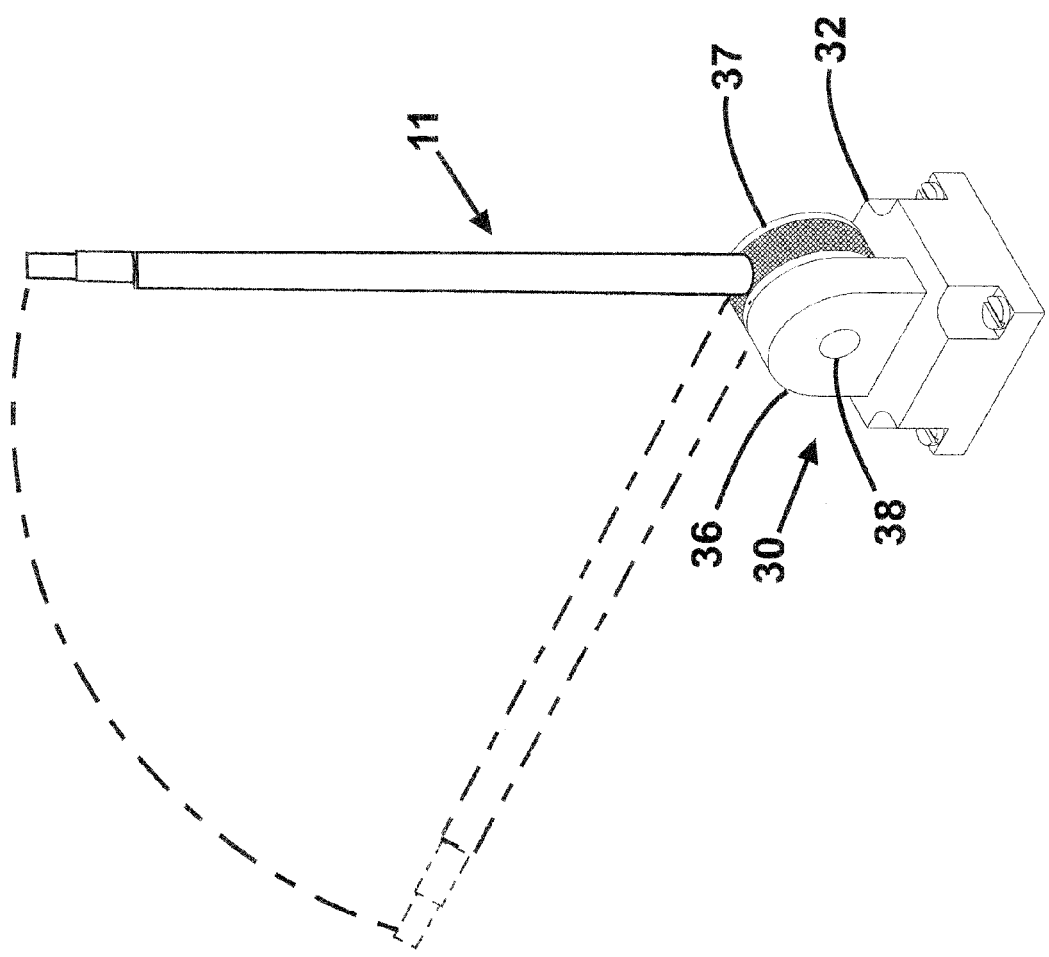
FIG. 3 illustrates a perspective view of an embodiment of the present invention capable of being mounted on a flat surface.

In FIG. 3, a mounting bracket 30 is shown which may be directly mounted onto a flat surface, such as the body of an ATV. The design of the mounting bracket 30 is similar to the previously described embodiments, except the base 32 is comprised on only one section and does not have a channel 33 within the base 32. Instead, the mounting bracket 30 is fastened directly to the body surface of the ATV via bolts or fasteners of various types or any other similar fastening mechanism.

In most situations, the present invention 10 will be utilized in pairs while used in conjunction with an ATV in order to adequately prevent the user from exposure to spider webs. When the telescoping rod assemblies 11 are in the extended position, a netting 17 may be attached to each of the telescoping rod assemblies 11. The netting 17 would be attachable by means of hook-and-loop fasteners or another similar type of attachment means. The netting 17, which would serve as a temporary wind shield, may be moved to a higher or lower position, depending upon the needs of the driver of the ATV.

The invention claimed is:

1. I claim a mountable telescoping rod device, comprised of:
   a mounting bracket capable of attaching to a bar structure wherein said mounting bracket is comprised of a base having of a first and second section, said first and second section each having a channel running through said section;
   a mounting stand secured to one of said first or second sections of said mounting bracket;
   a pivot block rotatably connected to said mounting stand; and
   a telescoping rod assembly secured to said pivot block.

* * * * *